Patented Aug. 23, 1949

2,480,006

UNITED STATES PATENT OFFICE 2,480,006

AZO DYESTUFFS

Friedrich Felix and Alphonse Heckendorn, Basel, Switzerland, assignors to Ciba Limited, Basel, Switzerland No Drawing. Application January 7, 1946, Serial No. 639,709. In Switzerland January 25, 1945

3 Claims. (Cl. 260—197)

It has been found that valuable azo-dyestuffs are obtained by coupling a hydroxynaphthalene, which is alklyated in the nucleus, with a diazo-compound in such a manner as to effect the coupling of the diazo-compound in ortho-position with respect to the hydroxy group, the chosen diazo-compound carrying in ortho-position to the diazo group a substituent which, if necessary after suitable conversion, is capable of participating in the formation of a complex metal compound in the finished dyestuff. As used herein, the term hydroxynaphthalene comprises hydroxynaphthalenes which are cycloalkylated in the nucleus.

The new products are valuable in mordant dyestuffs and may be converted into other valuable metalliferous dyestuffs by treatment in substance with agents yielding metal.

For the purpose of this invention hydroxynaphthalenes which are alkylated in the nucleus are defined to mean hydroxynaphthalenes which in addition to at least one OH-group contain at least one alkyl radical linked directly to the naphthalene nucleus, the ortho-position with respect to the OH-group (i. e. the 2-position in the case of 1-hydroxynaphthalene and the 1-position in the case of 2-hydroxynaphthalene) always remaining free.

Examples of such compounds are 4-methyl-1-hydroxynaphthalene, 4-ethyl-1-hydroxynaphthalene, 4-n-butyl-1-hydroxynaphthalene, 4-isobutyl-1-hydroxynaphthalene, 4-secondary butyl-1-hydroxynaphthalene, 4-tertiary butyl-1-hydroxynaphthalene, 4-amyl-1-hydroxynaphthalene, 4-isoamyl-1-hydroxynaphthalene, 4-tertiary amyl-1-hydroxynaphthalene, 4-α-ethylpropyl-1-hydroxynaphthalene, 4-α-methylbutyl-1-hydroxynaphthalene, 5-methyl-1-hydroxynaphthalene, 3-methyl-2-hydroxynaphthalene, 5-methyl-2-hydroxynaphthalene, 6-methyl-2-hydroxynaphthalene, 8-methyl-2-hydroxynaphthalene, 6-ethyl-2-hydroxynaphthalene, 3-isobutyl-2-hydroxynaphthalene, 3-secondary butyl-2-hydroxynaphthalene, 3-isoamyl-2-hydroxynaphthalene, 3-(1'-ethylpropyl)-2-hydroxynaphthalene, 3-(1'-methylbutyl)-2-hydroxynaphthalene, 3-(2'-methylbutyl)-2-hydroxynaphthalene, 3-tertiary amyl-2-hydroxynaphthalene, 4:6-dimethyl-1-hydroxynaphthalene, 3:4-dimethyl-1-hydroxynaphthalene, 3:7-dimethyl-2-hydroxynaphthalene, 3:6-dimethyl-2-hydroxynaphthalene, 4-methyl-6-isopropyl-2-hydroxynaphthalene, 3:5:7-trimethyl-2-hydroxynaphthalene. (Compare for instance U. S. Patents Nos. 2,073,996 and 2,073,997.) Furthermore, there may be used cycloalkylated hydroxynaphthalenes such as, for example, 4-cyclohexyl-1-hydroxynaphthalene and 6-cyclohexyl-2-hydroxynaphthalene. The hydroxynaphthalenes, which are alkylated in the nucleus and are serving as starting materials for the present process may as well be further substituted, for instance by sulfo groups, halogen atoms and the like.

Of the hydroxynaphthalenes which are alkylated in the nucleus those are of special advantage whose alkyl radical contains more than one carbon atom, and among these compounds the corresponding 4-alkyl-1-hydroxynaphthalenes.

As diazo-compounds there may be used above all those which are derived from amines which in ortho-position with respect to the NH₂-group carry a substituent capable of participating in the formation of metal complexes in the finished dyestuff. Such substituents are, for instance, preferably the OH-group, then the COOH-group, and, finally other atom groupings, for example, the OCH₂COOH—, the S—CH₃—, the S—CH₂—COOH-groups and the like. From among such amines there may be mentioned above all, ortho-aminophenols or ortho-aminonaphthols, like 1-hydroxy-2-amino-benzene, 1-hydroxy-2-amino-4-chlorobenzene, 1-hydroxy-2-amino-4-nitrobenzene, 1-hydroxy-2-amino-5-nitrobenzene, 1-hydroxy-2-amino-4:6-dinitrobenzene, 1-hydroxy-2-amino-4-nitro-6-chlorobenzene, 1-hydroxy-2-amino-4-chloro-6-nitrobenzene, 1-hydroxy-2-amino-4:5-dichlorobenzene, 1-hydroxy-2-amino-3:4:5-trichlorobenzene, sulfonic acids or carboxylic acids of such compounds, like 1-hydroxy-2-aminobenzene-4-sulfonic acid, 1-hydroxy-2-aminobenzene-4-carboxylic acid, 1-hydroxy-2-aminobenzene-6-carboxylic acid, 1-hydroxy-2-amino-6-chlorobenzene-4-sulfonic acid, 1-hydroxy-2-amino-4-chlorobenzene-6-sulfonic acid, 1-hydroxy-2-amino-5-nitrobenzene-4-sulfonic acid, 1-hydroxy-2-amino-4-nitrobenzene-6-sulfonic acid, 1-hydroxy-2-amino-6-nitrobenzene-4-sulfonic acid, 1-hydroxy-2-aminobenzene-4-sulfonic acid-6-carboxylic acid, 1-amino-2-hydroxy-naphthalene-4-sulfonic acid, 1-amino-2-hydroxy-6-nitronaphthalene-4-sulfonic acid, and the like.

As ortho-aminocarboxylic acids there can be employed among others, 1-aminobenzene-2-carboxylic acid, 1-amino-4-nitrobenzene-2-carboxylic acid, 1-aminobenzene-2-carboxylic acid-4-or-5-sulfonic acid, 2-aminonaphthalene-3-carboxylic acid, and the like.

In addition to the diazo-compounds which are derived from the above mentioned amines, mention may be made of those which carry a substituent in ortho-position to the diazo group which substituent is capable of participating in the formation of a complex metal compound in the finished dyestuff only after suitable conversion. Such diazo-compounds are derived, for example, from amines which in ortho-position with respect to the NH₂-group contain an esterified or etherified hydroxyl group or a substituent, for instance a halogen atom, which may be replaced by an OH-group. From among such amines there may be mentioned the acid sulfuric acid esters of the ortho-aminophenols or ortho-aminonaphthols mentioned in the preceding paragraph, for instance the acid sulfuric acid ester of 1-hydroxy-2-aminobenzene or of 1-hydroxy-2-amino-4-chlorobenzene, the corresponding alkylethers and their sulfonic acids, for example, 1-methoxy-2-aminobenzene, 1-methoxy-2-amino-4-nitrobenzene, 1-methoxy-2-aminobenzene-4-sulfonic acid, and the like, furthermore 1-chloro-2-aminobenzene, 1:4-dichloro-2-aminobenzene, 1-chloro-2-aminobenzene-4-sulfonic acid, and the like.

The coupling is carried out advantageously in an alkaline, preferably a caustic alkaline medium. When the substituents in the hydroxynaphthalene derivative which is alkylated in the nucleus are arranged in such a manner that coupling does not necessarily have to take place in ortho-position to the OH-group, the coupling may be caused to take the desired course through the use of a suitable diazo-compound (in the case of 1-hydroxynaphthalenes which are alkylated in the nucleus and which carry no substituents in 3-, 4- or 5-position by the use of diazotized ortho-aminonaphthols for instance) or through the use of suitable concentration and alkalinity conditions. When diazo-compounds which are esterified at the OH-group standing in ortho-position have been used to prepare the dyestuffs, and if these dyestuffs are to be used as after-chroming dyestuffs, they are converted into ortho:ortho'-dihydroxyazo-dyestuffs by treatment with saponifying agents.

Depending upon the components used, the new dyestuffs may serve either for dyeing or printing of a very wide variety of fibers of vegetable or animal origin. Especially valuable are the dyestuffs of the general formula

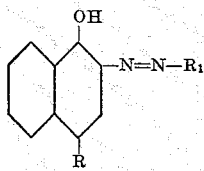

wherein R₁ is an aromatic radical of the benzene or naphthalene series carrying a hydroxyl group in o-position to the —N=N-group and R represents an alkyl radical containing more than 1 carbon atom, such as ethyl, propyl, isopropyl, butyl, isobutyl, amyl, isoamyl, hexyl or cyclohexyl radicals, and the like. These dyestuffs are especially suited for the dyeing of animal fibers. If components are used which contain no sulfogroups, products are obtained which by treatment with agents yielding metal, are converted into metalliferous pigments which are used to dye lacquers.

If the new dyestuffs corresponding to the foregoing general formula are prepared from diazo components which contain in ortho-position to the diazo group a hydroxy group or a carboxyl group and if the components are so chosen as to obtain dyestuffs with at least one sulfo group, these dyestuffs are especially suitable for dyeing wool in fast shades because after-chroming or dyeing in presence of chrome mordants will lead to dyeings which in addition to their excellent fastness to light also have excellent wet fastness properties. Among these dyestuffs, those which contain the sulfo group in the diazotizing components are especially valuable.

By treating these dyestuffs with agents yielding metal, preferably agents yielding chromium, but also other agents yielding metal, like copper, nickel, or cobalt compounds or mixtures of such products, acid dyestuffs are obtained which are suitable for the dyeing of animal fibers or fibers which have an affinity for acid dyestuffs.

Similar products are obtained if azo-dyestuffs are prepared from the diazotized amines which in ortho-position to the amino group contain a substituent which is capable of being converted or changed into an OH-group and if the dyestuffs so obtained are treated with the agents yielding metal under conditions necessary to bring about saponification or conversion of the substituent into an OH-group.

The following examples illustrate the invention but are not to be regarded as limiting it in any way, the parts being by weight unless otherwise stated and the relationship of parts by weight to parts by volume being the same as that of the kilogram to the liter.

*Example 1*

20 parts of 4-butyl-1-hydroxynaphthalene are dissolved in 75 parts of water and 15 parts by volume of caustic soda solution of 30 per cent. strength to give a clear solution, to which 18 parts of sodium carbonate are added. Then a diazo solution, prepared in the usual manner from 23.4 parts of 1-hydroxy-2-amino-4-nitrobenzene-6-sulfonic acid is added to the solution of the coupling component. Coupling takes place instantly. The whole is stirred for six hours whereupon the separated dyestuff is filtered off with suction. In order to be purified, it is taken up in water again, stirred, then suction-filtered and dried. The dyestuff which in its free state corresponds to the formula

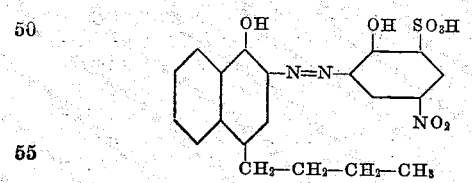

is a dark powder which dissolves in water with a violet coloration and dyes wool in greenish olive tints, both by the after-chroming process and if chromed during the dyeing process. The dyeings obtained are remarkable for their very good wet fastness properties and especially their good fastness to light. The replacement of 4-butyl-1-hydroxy-naphthalene by 4-ethyl-1-hydroxynaphthalene leads to chroming dyestuffs which also give olive dyeings.

A similar dyestuff, which dyes wool in both chroming processes in blue-gray tints, is obtained if as diazo component 22.4 parts of 1-hydroxy-2-amino-4-chlorobenzene-6-sulfonic acid and as coupling component 20 parts of 4-butyl-1-hydroxynaphthalene are used, and another similar dyestuff is obtained by using 4-ethyl-1-hydroxynaphthalene instead of 4-butyl-1-hydroxynaphthalene,

Example 2

17.2 parts of 4-ethyl-1-hydroxynaphthalene and 200 parts of caustic soda solution of 30 per cent. strength are made into a paste while stirring and 25 parts of the diazo compound of 1-amino-2-hydroxynaphthalene - 4 - sulfonic acid are gradually added while stirring; the dark blue dyestuff paste is then allowed to stand over night, diluted with water, salted out with sodium chloride and the dyestuff is then filtered off with suction. In the free state it corresponds to the formula

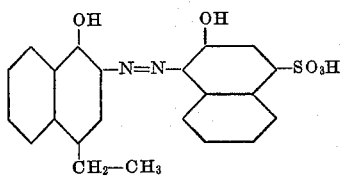

To be purified further, the dyestuff is again taken up in water, salted out with sodium chloride, filtered with suction and dried.

A dark powder is obtained which is soluble in water and dyes wool in the after-chroming process in reddish dark blue tints.

If 20 parts of 4-butyl-1-hydroxynaphthalene are used instead of 4-ethyl-1-hydroxynaphthalene, a similar dyestuff is obtained which dyes wool in the after-chroming process in dark blue tints of very good wet fastness properties and good fastness to light.

Example 3

100 parts of well wetted wool are introduced at a temperature of 60° C. into a dyebath containing, in 4000 parts of water, 1 part of the dyestuff obtained according to the first paragraph of Example 1, 2.5 parts of ammonium sulfate, 2.5 parts of sodium chromate and 10 parts of Glauber salt. The temperature is raised to the boil within 30 minutes and dyeing is carried out for 45 minutes at the boil. 0.5-1 per cent of acetic acid of 40 per cent. strength is then added and dyeing is continued for another hour, followed by rinsing and drying. The wool is dyed fast green-olive tints.

Example 4

100 parts of well wetted wool are introduced at 60° C. into a dyebath containing, in 4000 parts of water, 1 part of the dyestuff obtained according to the second paragraph of Example 1, 4 parts of acetic acid and 10 parts of Glauber salt. The temperature is raised to the boil within 30 minutes and dyeing is carried out for 45 minutes at the boil. 1 part of sulfuric acid of 66° Bé. is added and dyeing continues for another 15 minutes at the boil, the dyebath is cooled down to about 70° C. 1 part of potassium bichromate is added, the temperature is raised to the boil and chroming is then carried out for about 40 minutes, followed by rinsing and drying. The wool is dyed fast blue-gray tints.

What we claim is:

1. An azo dyestuff which in its free state corresponds to the formula

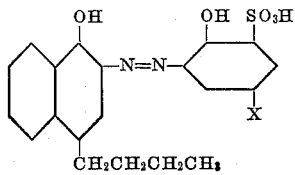

wherein $x$ stands for a member selected from the group consisting of $NO_2$ and Cl.

2. The azo dyestuff of the formula

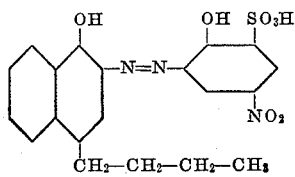

3. The azo dyestuff of the formula

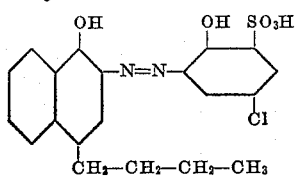

FRIEDRICH FELIX.
ALPHONSE HECKENDORN.

REFERENCES CITED

The following references are of record in the file of this patent:

UNITED STATES PATENTS

| Number | Name | Date |
|---|---|---|
| 303,335 | Spiegel | Aug. 12, 1884 |
| 1,314,921 | Andrews | Sept. 2, 1919 |
| 2,052,477 | Krebser | Aug. 25, 1936 |
| 2,090,938 | Conrad | Aug. 24, 1937 |
| 2,229,200 | Wehrli | Jan. 21, 1941 |
| 2,353,675 | Knecht et al. | July 18, 1944 |
| 2,405,816 | Conzetti | Aug. 13, 1946 |

FOREIGN PATENTS

| Number | Country | Date |
|---|---|---|
| 771,420 | France | |